(12) United States Patent
Bongartz

(10) Patent No.: US 12,320,376 B2
(45) Date of Patent: Jun. 3, 2025

(54) DRIVE ELEMENT

(71) Applicant: Nicole Bongartz, Neuss (DE)

(72) Inventor: Nicole Bongartz, Neuss (DE)

( * ) Notice: Subject to any disclaimer, the term of this patent is extended or adjusted under 35 U.S.C. 154(b) by 220 days.

(21) Appl. No.: 17/919,035

(22) PCT Filed: Apr. 16, 2021

(86) PCT No.: PCT/EP2021/059983
§ 371 (c)(1),
(2) Date: Oct. 14, 2022

(87) PCT Pub. No.: WO2021/209624
PCT Pub. Date: Oct. 21, 2021

(65) Prior Publication Data
US 2023/0235772 A1    Jul. 27, 2023

(30) Foreign Application Priority Data
Apr. 16, 2020   (DE) .......................... 102020110450.2

(51) Int. Cl.
*F16B 23/00*    (2006.01)
*B25B 15/00*    (2006.01)

(52) U.S. Cl.
CPC .......... *F16B 23/003* (2013.01); *B25B 15/005* (2013.01)

(58) Field of Classification Search
CPC ................ F16B 23/003; F16B 23/0007; F16B 23/0023; F16B 23/00; B25B 15/005; B25B 15/004; Y10S 411/91; Y10S 411/919

(Continued)

(56) References Cited

U.S. PATENT DOCUMENTS

| | | | | |
|---|---|---|---|---|
| 2,969,250 A | * | 1/1961 | Kull ...................... | B25B 13/065 |
| | | | | 81/460 |
| 3,908,489 A | * | 9/1975 | Yamamoto .......... | F16B 23/0061 |
| | | | | 81/186 |

(Continued)

FOREIGN PATENT DOCUMENTS

| | | | | |
|---|---|---|---|---|
| DE | 2451373 A1 | | 5/1975 | |
| DE | 4446415 A1 | * | 6/1995 | ........... B25B 15/005 |

(Continued)

*Primary Examiner* — Kristina R Fulton
*Assistant Examiner* — Jock Wong
(74) *Attorney, Agent, or Firm* — CALDERON SAFRAN & WRIGHT P.C.

(57) ABSTRACT

A drive element has an internal driving profile that defines a profile axis ($P_I$) and has, on its inner side, a plurality of concave drive surfaces arranged in a manner distributed regularly around the profile axis ($P_I$), between which a planar or convexly curved transition surfaces are provided, or which has an external driving profile that defines a profile axis ($P_A$) and has, on its outer side, a plurality of concave drive faces arranged in a manner distributed regularly around the profile axis ($P_A$), between which planar or convexly curved transition surfaces are provided. Transitions between the drive surfaces and transition surfaces lie on a common inner circle with an inner diameter $D_i$. The drive surfaces lie on outer circles of an outer diameter $D_a$ distributed uniformly around the profile axis.

25 Claims, 8 Drawing Sheets

(58) Field of Classification Search
USPC .................. 411/403, 407, 402; 81/460, 461
See application file for complete search history.

(56) References Cited

U.S. PATENT DOCUMENTS

| | | | | |
|---|---|---|---|---|
| 5,251,521 | A | * | 10/1993 | Burda .................. B25B 15/008 |
| | | | | 81/436 |
| 5,279,190 | A | * | 1/1994 | Goss ..................... B25B 15/005 |
| | | | | 81/460 |
| 2002/0184976 | A1 | | 12/2002 | Mizuno et al. |
| 2006/0266168 | A1 | * | 11/2006 | Pacheco, Jr. .......... F16B 23/003 |
| | | | | 81/460 |
| 2010/0129176 | A1 | | 5/2010 | Karupaya |
| 2010/0269644 | A1 | | 10/2010 | Edland et al. |
| 2011/0217143 | A1 | | 9/2011 | Hughes et al. |
| 2012/0099944 | A1 | * | 4/2012 | Kageyama .......... F16B 23/0023 |
| | | | | 81/52 |
| 2015/0063948 | A1 | * | 3/2015 | Buhl ..................... B23G 9/002 |
| | | | | 411/406 |
| 2016/0223005 | A1 | | 8/2016 | Rathmann et al. |
| 2021/0270305 | A1 | | 9/2021 | Bongartz |

FOREIGN PATENT DOCUMENTS

| | | | | |
|---|---|---|---|---|
| DE | 102005011734 | A1 | | 9/2006 |
| DE | 102013103463 | A1 | | 10/2014 |
| EP | 0430563 | A1 * | | 6/1991 |
| EP | 3336368 | A1 * | 6/2018 | ........... B25B 15/008 |
| JP | H03163207 | A * | | 7/1991 |
| WO | WO-2008136765 | A1 * | 11/2008 | ............... B21H 3/00 |
| WO | WO2013062895 | A1 | | 5/2013 |
| WO | WO2019238250 | A1 | | 12/2019 |

\* cited by examiner

DRIVE ELEMENT

CROSS-REFERENCE TO RELATED APPLICATIONS AND CLAIM TO PRIORITY

This application is a national stage application of International Application No. PCT/EP2021/059983 filed Apr. 16, 2021, which claims priority to German Patent Application No. 10 2020 110 450.2 filed Apr. 16, 2020, the disclosures of which are incorporated herein by reference and to which priority is claimed.

FIELD OF THE INVENTION

The present invention relates to a drive element which—in particular at one end of a shaft—has an inner driving profile which defines a profile axis and has on its inner side a plurality of concave drive surfaces which are distributed uniformly around the profile axis and between which planar or convexly curved transition surfaces are provided, or which has an outer driving profile which defines a profile axis and has on its outer side has a plurality of concave drive surfaces which are distributed uniformly around the profile axis and between which flat or convexly curved transition surfaces are provided, wherein in cross-section, the transition points or transitions between the drive surfaces and the transition surfaces lie on a common inner circle with the inner diameter $D_i$, and the drive surfaces lie on outer circles of diameter $D_a$ distributed uniformly around the profile axis and are formed symmetrically with respect to their longitudinal central plane enclosing the profile axis.

Furthermore, the invention relates to a method for connecting of two components, in particular a screw and a turning tool in a rotationally fixed manner, one of the components being designed as a drive element with an outer driving profile and the other component being designed as a drive element with an inner driving profile, in which the driving profiles of the two components are axially plugged together in order to produce a rotationally fixed connection between the two components.

BACKGROUND OF THE INVENTION

Screws and turning tools are known from the prior art in various designs. The screws comprise a screw shank with an external thread, on the upper end region of which a driving profile is provided for coupling with a turning tool, which is usually formed on a screw head. The turning tools are formed, for example, in the form of ring or open-end wrenches or comprise interchangeable bits that are connected to a drive, for example in the form of a handle or a cordless screwdriver, via a bit holder. Alternatively, the bit holder can be connected to a screwdriver handle or an angled handle, a ratchet, a torque wrench, a cordless screwdriver or a ratchet screwdriver via an adapter for alternate use.

Screw and turning tool are offered for transmitting a torque from the turning tool to the screw with driving profiles configured complementary to each other. For this purpose, one of the two components has an outer drive profile with outer drive surfaces at one of its free ends, and the other component has an inner drive profile with inner drive surfaces at its one free end, complementary to the outer drive profile. The driving profiles are, for example, in the form of an inner hexagon, an outer hexagon, a 6-point star-shaped pattern, such as a Torx™ profile and a cross-slot profile or slot profile. After coupling the inner drive profile to the outer drive profile, the drive profiles are in contact with each other with play. This means that the driving profiles can become unintentionally detached from one another and it is also not possible to align the driving profiles axially with one another. To simplify handling when screwing in and loosening the screw with the turning tool, turning tools that are provided with a magnet or ferromagnetic turning tools that can be magnetized with a magnet are offered. However, this is associated with additional expense. Furthermore, by using a magnetic turning tool, a coaxial alignment of the driving profiles cannot be achieved either. However, such a coaxial alignment is necessary in order to be able to integrate bolted joints into automatic manufacturing processes.

To solve this problem, it is known from DE 10 2005 011 734 A1 that the drive surface of a turning tool for screwing in and loosening so-called Torx™ screws is inclined at an acute angle to the profile axis, so that when the drive profiles of the turning tool and the screw are axially fitted together, a tight fit is produced and thus no additional holding means are required to screw the screw into a thread. Similarly, it is known from WO 2013/062895 A1 and US 2010/0269644 A1 to form the drive surfaces of the screw and turning tool at an incline in order to create a tight fit between the components.

A problem that repeatedly occurs when screwing in and loosening screws is that the drive profiles are damaged, especially in the area of the edges, if the torques required for screwing in/loosening the screw are too high.

To solve this problem, WO 2019/238250 A1 proposes a drive system with a screw and a turning tool, the driving profiles of which are tapered. Furthermore, the outer driving profile has concave, i.e. inwardly curved driving surfaces in the shape of a segment of a circular arc towards the profile axis, and the inner driving profile has driving surfaces complementary to this. The arrangement is such that, when mated, the drive surfaces of the two components come into contact/engagement on both sides of the apex of the concave curvature when viewed in the circumferential direction.

In addition to a positive and torsionally rigid connection, this design also produces a frictional or clamping connection between the screw and the turning tool, via which the components are axially connected and coaxially aligned with each other. Furthermore, the force or torque is transmitted exclusively via the two-dimensional contact that takes place in the drive surfaces curved in the shape of an arc on both sides of the apex, while there is no contact in the transition areas/transition surfaces located between the drive surfaces. In this way, damage to the edge regions or peripheral areas of the drive surfaces can be completely avoided.

SUMMARY OF THE INVENTION

The task of the invention is to further optimize the aforementioned drive system and, in particular, to enable high torque transmission and a high number of load cycles.

This task is solved in a drive element of the type mentioned above in that the outer diameter $D_a$ and the center-to-center distance L between the centers of the inner circle and of the outer circles are selected as a function of the inner diameter $D_i$ such that the normal force acting at the transition points between in each case one drive surface and the adjacent transition surface when a torque $M_D$ about the profile axis is introduced into the drive profile is tangential to the drive surface adjacent to the one drive surface or runs within the latter. In other words, the normal force is directed into the central region of the drive profile, which lies between the adjacent drive surface and the profile axis.

Accordingly, the task is solved in a method for the rotationally fixed connection of two components, in particular a screw and a rotary tool, of the type mentioned at the beginning, in that the components are designed as drive elements according to the invention and the driving profiles of the drive elements are selected to be complementary to one another in such a way that the drive surfaces of the components come into contact with one another in a 2-dimensional manner when the driving profiles are axially plugged together, so that a frictional and/or clamping connection, via which the components are axially connected to one another, is produced between the components.

It has been shown that optimum results can be achieved with regard to the achievable number of load cycles and transmissible torques if the normal forces generated during a torque transmission at the drive surfaces are directed towards the core of the driving profile and thus the areas lying between the concavely curved drive surfaces are not or hardly loaded by the normal forces due to bending and/or shear forces. This is achieved by matching the outer diameter $D_a$, the inner diameter $D_i$ and the center-to-center distance L in accordance with the invention. Normal force is understood to be that portion of a lever force introduced into the drive profile to generate the torque which runs perpendicular to the respective circular-segment-shaped drive surface and thus through the center of its circle.

According to one embodiment of the invention, it is provided that the center-to-center distance L is calculated according to the formula $L=F(L, D_i)D_i$, where $F(L, D_i)=0.494e^{(0.605K)}$. Here, the running ratio $K=D_a/D_i$ should be in the range of 0.3 and 2.0.

According to one embodiment of the invention, it is provided that it has an inner driving profile and the drive surfaces of the inner driving profile are inclined with respect to the profile axis, whereby they approach the profile axis starting from an insertion opening of the inner driving profile towards a rear end of the inner driving profile. A preferred embodiment of this embodiment is characterized in that the drive surfaces of the inner driving profile are inclined relative to the profile axis by an angle of inclination $\alpha_I$ which is at least 1°, in particular at least 1.5° and/or in that the drive surfaces of the inner driving profile are inclined relative to the profile axis by an angle of inclination $\alpha_I$ of at most 5°, in particular at most 3.5° and preferably at most 3°, the angle of inclination $\alpha_I$ preferably being 2°±0.2° or 3°±0.2°.

In a further embodiment of this embodiment, it can be provided that the transition surfaces are inclined with respect to the profile axis and, starting from an insertion opening of the inner driving profile, approach the profile axis towards the rear end of the inner driving profile. One embodiment of this embodiment is characterized in that the transition surfaces are inclined relative to the profile axis by an angle of inclination $\beta_I$ which is at least 1°, in particular at least 1.5°, and/or in that the transition surfaces of the inner entrainment profile are inclined relative to the profile axis by an angle of inclination $\beta_I$ of at most 5°, in particular at most 3.5° and preferably at most 3°, the angle of inclination $\beta_I$ preferably being 2°±0.2° or 3°±0.2°. In a preferred manner, the angle of inclination $\alpha_I$ of the drive surfaces relative to the profile axis is exactly as large as the angle of inclination $\beta_I$ of the transition surfaces relative to the profile axis.

In other words, the inner drive profiles are designed to converge conically from their insertion opening.

In the same way, the drive surfaces of an outer driving profile of a drive element according to the invention can be inclined relative to the profile axis, whereby they approach the profile axis towards an insertion end of the outer driving profile. It is expedient here to provide that the drive surfaces are inclined relative to the profile axis by an angle of inclination $\alpha_A$ which is at least 0.5°, in particular at least 1° and/or at most 1.5, the angle of inclination $\alpha_A$ preferably being 1.15°±0.2.

In this case, the transition surfaces can run parallel to the profile axis. According to one embodiment of the invention, however, it is provided that the transition surfaces are inclined relative to the profile axis at an angle of inclination $\beta_A$ which is greater than 0° and less than 0.7° and is preferably 0.4°±0.05.

In a further embodiment of this embodiment, it is provided that the angle of inclination $\beta_A$ of the transition surfaces relative to the profile axis is smaller than the angle of inclination $\alpha_A$ of the drive surfaces relative to the profile axis, wherein the ratio of the angle of inclination $\alpha_A$ to the angle of inclination $\beta_A$ is ≥2, in particular ≥2.5, and is preferably 2.8±0.2.

According to a preferred embodiment of the invention, the outer diameter $D_a$ is constant over the axial length of the drive profile. It should be taken into account here that the drive surfaces can be manufactured differently in the case of a conically converging driving profile. On the one hand, a cylindrical cutter can be used, which is then adjusted according to the desired taper angle. In this case, the drive surfaces have the pure circular shape in a plane perpendicular to the respective flank angle of the tapered driving profile, while the pure circular shape is slightly elliptically distorted in a sectional plane perpendicular to the profile axis. Similar distortions may occur in other manufacturing processes. Such deviations are to be regarded as manufacturing tolerances.

Similarly, the inner diameter $D_i$ can be constant over the axial length of the driving profile or, in adaptation to an inclination of the transition surfaces, increase continuously in the case of an inner driving profile in the direction of its insertion opening and, in the case of an outer driving profile, increase starting from its insertion end. In the latter case, the claimed conditions and thus the claimed course of the normal forces must be present at the tapered end of the outer driving profile, preferably over its entire effective length.

As is usual with screw heads, the driving profile preferably has five or six driving surfaces. However, a different number is possible.

In a preferred manner, the drive element is a screw and the drive profile is formed on the screw head. Likewise, the drive element can be a screw bit.

According to a preferred embodiment of the method according to the invention, it is provided that the driving profiles of the two components have drive surfaces inclined to the profile axis and the driving profiles of the components are selected to be complementary to one another in such a way that the drive surfaces of the components come into 2-dimensional contact with one another when the driving profiles are axially plugged together, so that a frictional and/or clamping connection, via which the components are axially connected to one another, is produced between the components.

In the method according to the invention, pairs of components to be connected in a rotationally fixed manner are assigned to one another in the manner of a kit, the components fitting together and being designed to correspond to one another. In one embodiment of the invention, the two components are selected such that the driving profiles of the two components have driving surfaces inclined to their respective profile axis. In a preferred embodiment, it is provided that the angle of inclination $\alpha_i$ by which the drive surfaces of the inner driving profile are inclined relative to the profile axis is greater than the angle of inclination $\alpha_A$ by which the drive surfaces of the outer driving profile are inclined relative to the profile axis. It may be provided that the angle of inclination $\alpha_i$ of the drive surfaces of the inner driving profile is 3°±0.2° and the angle of inclination $\alpha_A$ of the drive surfaces of the outer driving profile is 1.15°±0.15° with respect to the profile axis, or that the angle of inclination $\alpha_i$ of the drive surfaces of the inner driving profile relative to the profile axis is 2°±0.2° and the angle of inclination $\alpha_A$ of the drive surfaces of the outer driving profile relative to the profile axis is 1.15°±0.15°. This design ensures that the drive profiles engage at their tapered ends, but that there is a small gap towards the thicker ends. It has been shown that this ensures a secure connection even with force loads directed transverse to the profile axes.

Similarly, it may be provided that the transition surfaces of the driving profiles of the two components are inclined to the respective profile axis, wherein the angle of inclination $\beta_i$ of the transition surfaces of the inner driving profile relative to the profile axis to the angle of inclination by which the transition surfaces of the outer driving profile are inclined relative to the profile axis is ≥5, in particular ≥6 and preferably ≥7.5.

According to a further embodiment of the method according to the invention, it can be provided that drive elements are used in which the outer diameter of the inner driving profile is smaller, in particular by 1.5-3% and preferably 2% smaller, than the outer diameter of the outer driving profile.

It has been shown that the slight undersize in the outer driving profile can compensate for wear phenomena on the cutting inserts during the manufacture of the drive surfaces.

In a further embodiment of this embodiment, it can be provided that the drive surfaces of the two components come into 2-dimensional contact with each other over at least 25%, in particular at least 40% and preferably at least 60% of their extension in the circumferential direction.

Preferably, the two components come into contact at each contact surface on both sides of the longitudinal center plane thereof. Likewise, the driving profiles can be designed so that they do not come into contact in the area of the transition surfaces.

BRIEF DESCRIPTION OF THE DRAWINGS

Further features and advantages of the present invention are illustrated with reference to the accompanying drawing. In the drawing shows.

DETAILED DESCRIPTION OF THE PREFERRED EMBODIMENT(S)

Figure 1:
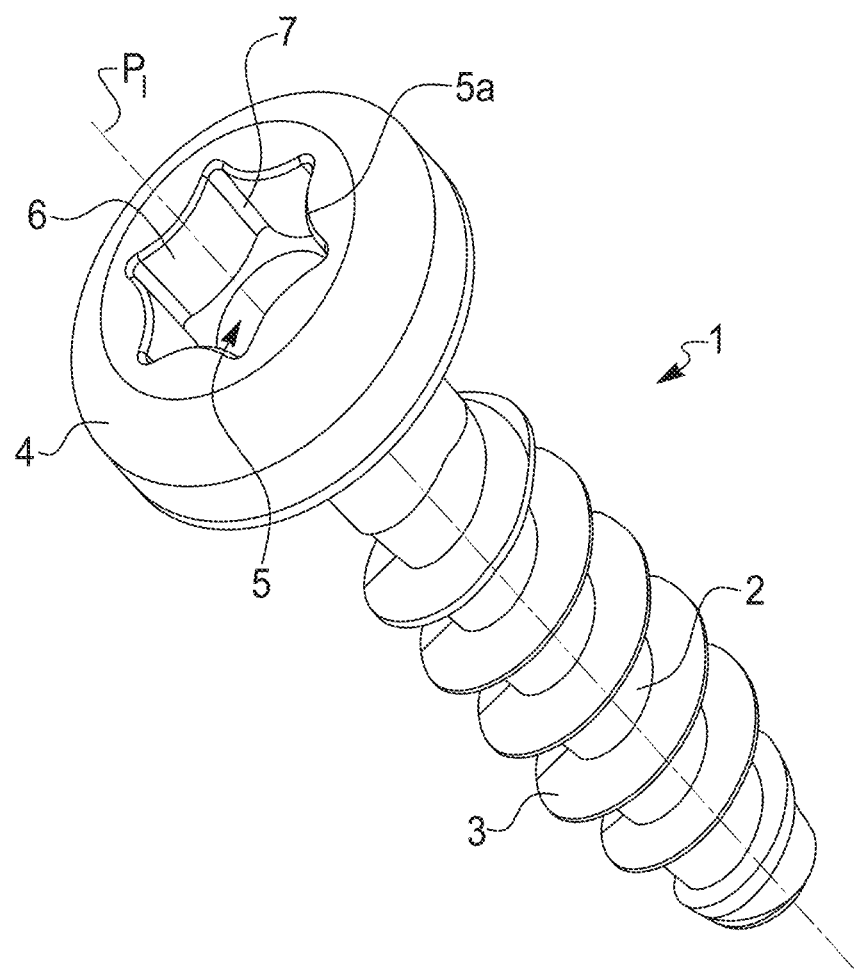
FIG. 1 a perspective view of a screw with an internal drive profile.

FIG. 1 shows an example of a drive element in the form of a screw 1. The screw 1 comprises a shank 2 which carries an external thread 3 and defines a longitudinal axis of the screw 1. A screw head 4 is provided at the upper end of the shank 2, which has on its inner side an inner driving profile 5 open towards the upper side of the screw head 4 and having inner driving surfaces 6, which defines a profile axis $P_I$ lying coaxially with the longitudinal axis of the screw 1. Thereby, the open upper side forms an insertion opening 5a of the inner driving profile 5 for a screw bit.

In cross-section or in plan view, the inner driving profile 5 has the basic shape of a regular hexagon, the side faces of which form the drive surfaces 6, which are inclined with respect to the profile axis $P_I$ or the longitudinal axis of the screw 1 at an angle of inclination $\alpha_I$ of 2°, so that they approach the profile axis $P_I$ from the insertion opening 5a of the inner driving profile 5 towards the rear end of the inner driving profile 5. In other words, the driving profile 5 tapers in the screw head 4. For small screws, the angle of inclination $\alpha_I$ can also be 3°.

The drive surfaces 6 of the inner drive profile 5 have a concave cross-section, i.e. they are curved inwards towards the profile axis $P_I$. Specifically, the concave drive surfaces 6 each have a circular arc segment shape in cross section, whereby the radius of the drive surfaces 6 is constant over their entire axial length.

The drive surfaces 6 are connected to each other at the six corners by transition areas or transition surfaces 7, which are convexly curved and have the shape of an arc of a circle, as a result of which they project outward in a beam-like manner. The transition between the transition areas 7 and the drive areas 6 is continuous. The transition surfaces 7 are inclined with respect to the profile axis $P_I$, whereby they approach the profile axis $P_I$ starting from the insertion opening 5a of the inner driving profile 5 towards the rear end of the inner driving profile 5. In this case, the angle of inclination $\beta_I$ of the transition surfaces 7 with respect to the profile axis $P_I$ is exactly as large as the angle of inclination $\alpha_I$ of the drive surfaces with respect to the profile axis $P_I$ and is thus 2° in the illustrated embodiment example.

Figure 2:
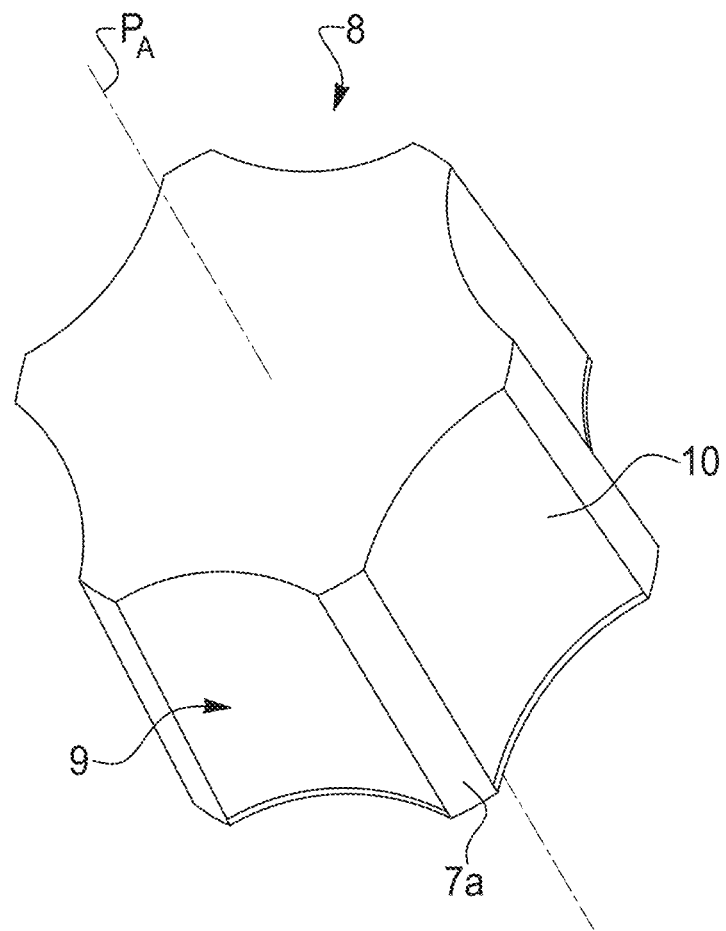
FIG. 2 a perspective view of a drive element in the form of a screw bit with an outer drive profile according to the invention, which corresponds to the drive profile of the screw according to FIG. 1, FIG. 3 schematically an engagement between a screw bit and a screw in a sectional view showing angles of inclination $\alpha_A$ and $\alpha_I$ of the drive surfaces, FIG. 4 an enlarged view of detail X from FIG. 3, FIG. 5 schematically the engagement in another sectional view, which shows angles of inclination $\beta_A$ and $\beta_I$ of the transition surface, FIG. 6 an enlarged view of unit Z from FIG. 5.
Figure 3:
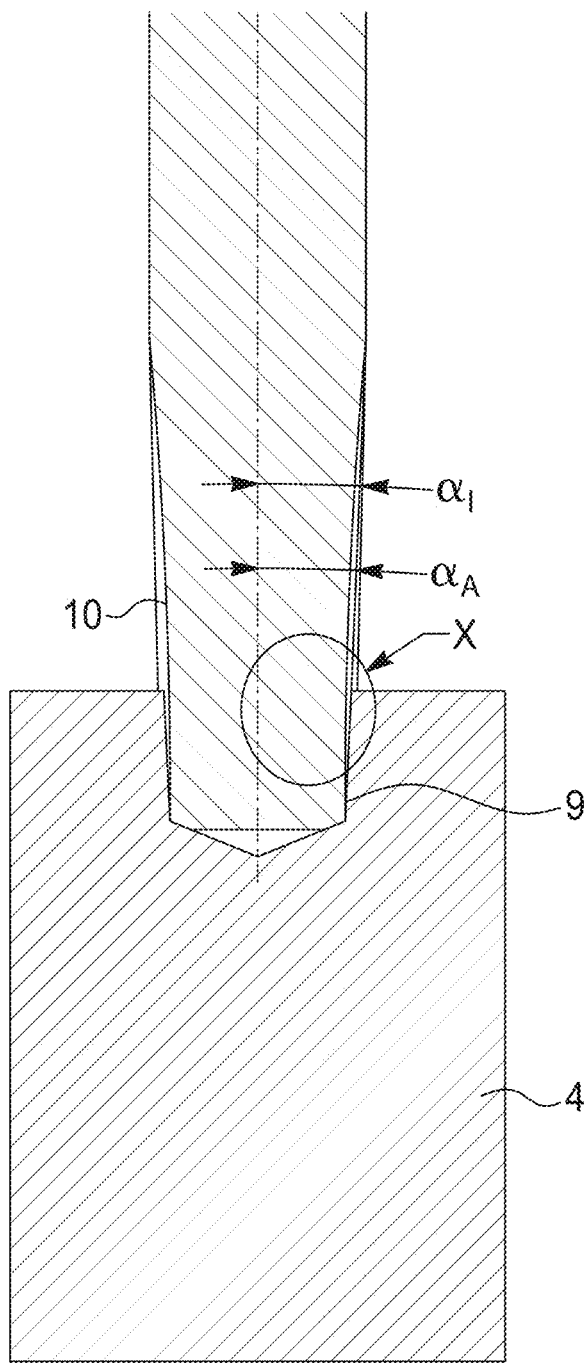
Figure 4:
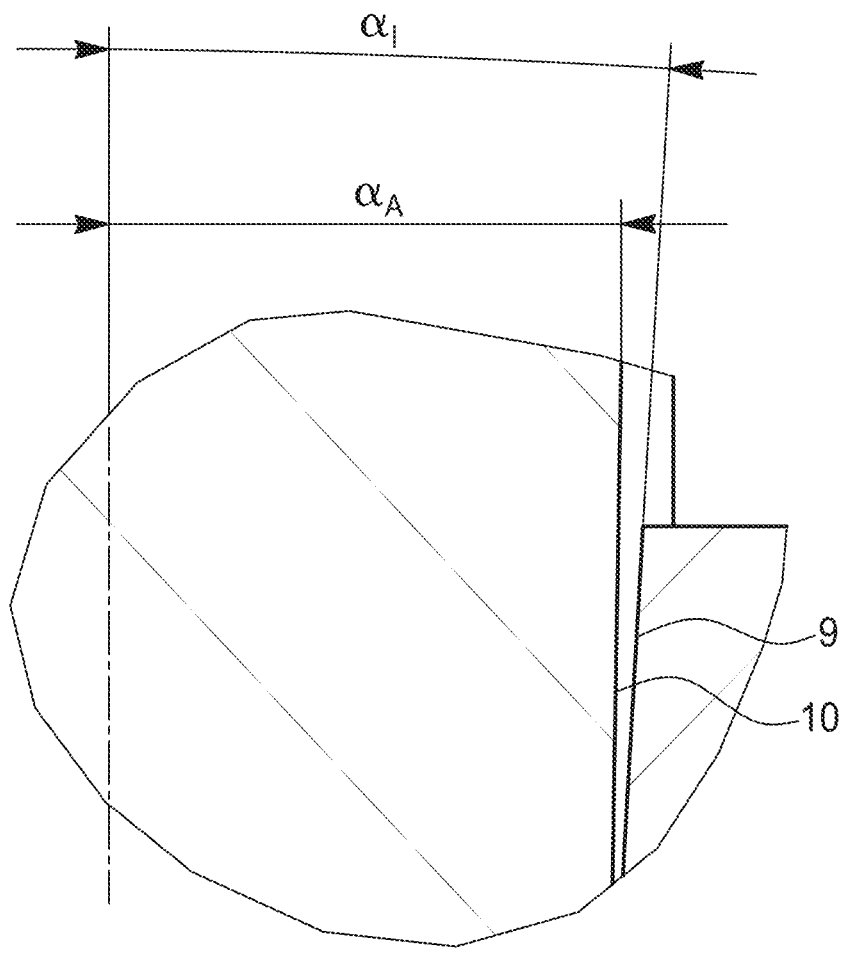

In FIG. 2, a driving element/turning tool 8 in the form of a screw bit is shown, which is designed to operate the screw 1 shown in FIG. 1. The turning tool 8 has an outer driving profile 9, the lower end of which is provided on a shaft of the screw bit that is not shown and is designed to correspond to the driving profile 5 of the screw 1, whereby it defines a profile axis $P_A$. Correspondingly, the outer driving profile 9 also has the basic shape of the hexagon in cross-section, wherein the drive surfaces 10 of the driving profile 9 are concave, i.e. curved in the direction of the profile axis $P_A$ and run at an angle to the profile axis $P_A$. Specifically, the drive surfaces 10 of the screw bit are inclined at an angle $\alpha_A$ of 1.15° with respect to the profile axis $P_A$, whereby they approach the profile axis $P_A$ towards a free insertion end— the upper end in FIG. 2—of the outer driving profile 9, with which the outer driving profile 9 is inserted into the inner driving profile 5 of a screw 1. The drive surfaces 10 of the screw bit thus run somewhat steeper than the drive surfaces 9 of the screw (see FIGS. 3 and 4). The drive surfaces 10 have a circular arc segment-shaped cross section with a radius that is constant over their axial length and has the same value as the radius of curvature of the drive surfaces 6 of the screw 1.

The drive surfaces 10 are continuously connected to each other by convex transition areas or transition surfaces 7a, which are also tapered and have a circular arc shape.

Figure 5:
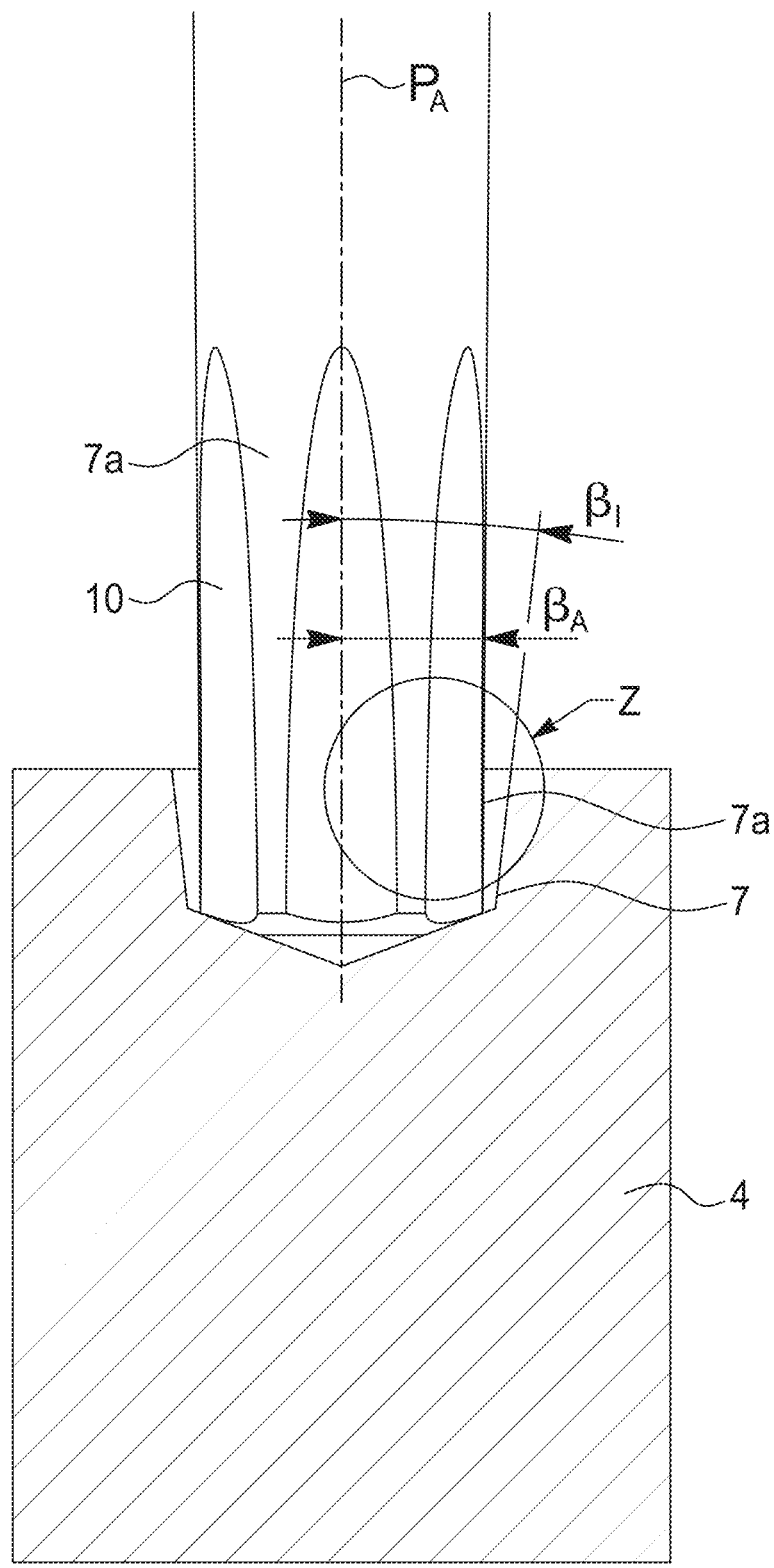
Figure 6:
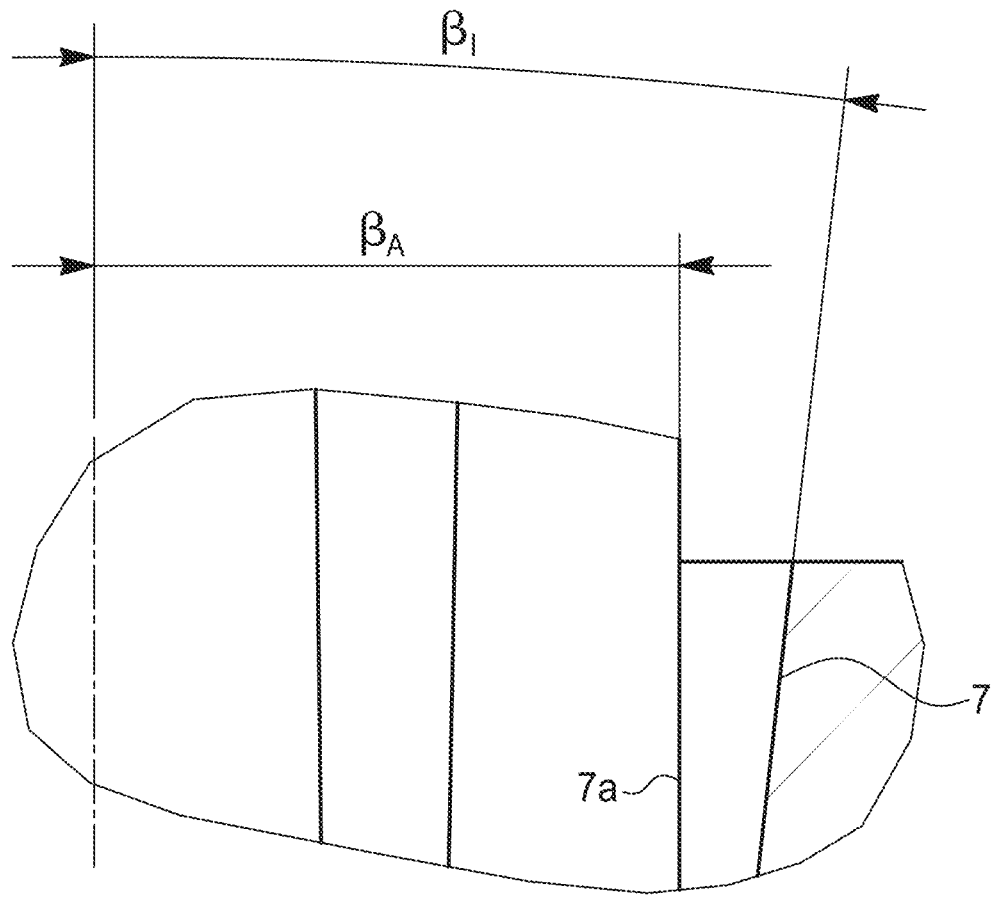

As with the inner driving profile 5, the transition surfaces 7a of the outer driving profile 9 are inclined relative to the profile axis $P_A$, approaching the profile axis $P_A$ towards the insertion end of the outer driving profile 9. Thereby, the angle of inclination $\beta_A$ of the transition surfaces 7a to the profile axis $P_A$ is 0.4°. This means that the angle of inclination $\beta_A$ of the transition surfaces 7a relative to the profile axis $P_A$ is significantly smaller than the angle of inclination $\alpha_A$ of the drive surfaces 10 with respect to the profile axis $P_A$, where the ratio of the angle of inclination $\alpha_A/\beta_A$ is almost 3. Furthermore, the angle of inclination $\beta_A$, by which the transition surfaces 7a of the outer drive profile 9 are inclined relative to the profile axis $P_A$, is significantly smaller than the angle of inclination $\beta_I$, by which the transition surfaces of the inner drive profile are inclined relative to the profile axis $P_I$ (see FIGS. 5 and 6). In the present case, the ratio $\beta_I/\beta_A$ is 7.5. The arrangement is such that the transition areas of the screw 1 and a corresponding screw bit 8 do not come into contact with each other. Accordingly, the radius of curvature of the transition regions 7a in the bit 8 is larger than the radius of curvature of the transition regions 7 in the screw 1.

In other words, arrangement is made in such a way that a 2-dimensional contact/engagement between the driving profiles 5, 9 takes place exclusively in the region of the drive surfaces 6, 10, but not in the intermediate transition regions 7, 7a, and the contact zones, viewed in the circumferential direction, extend in each case on both sides of the apex of the concavely curved drive surfaces 6, 10. It is desired that there is a 2-dimensional contact between the drive surfaces 6, 10 of the two components 1, 8 in the mated state, so that the two components 1, 8 are aligned exactly coaxially with one another when their two driving profiles 5, 9 are mated axially until a clamping connection is produced between the two components 1, 8 due to the conicity of the driving profiles 5, 9 of the drive surfaces 6, 10. Furthermore, the two-dimensional contact creates a frictional connection via which high torques can be transmitted.

Figure 7:
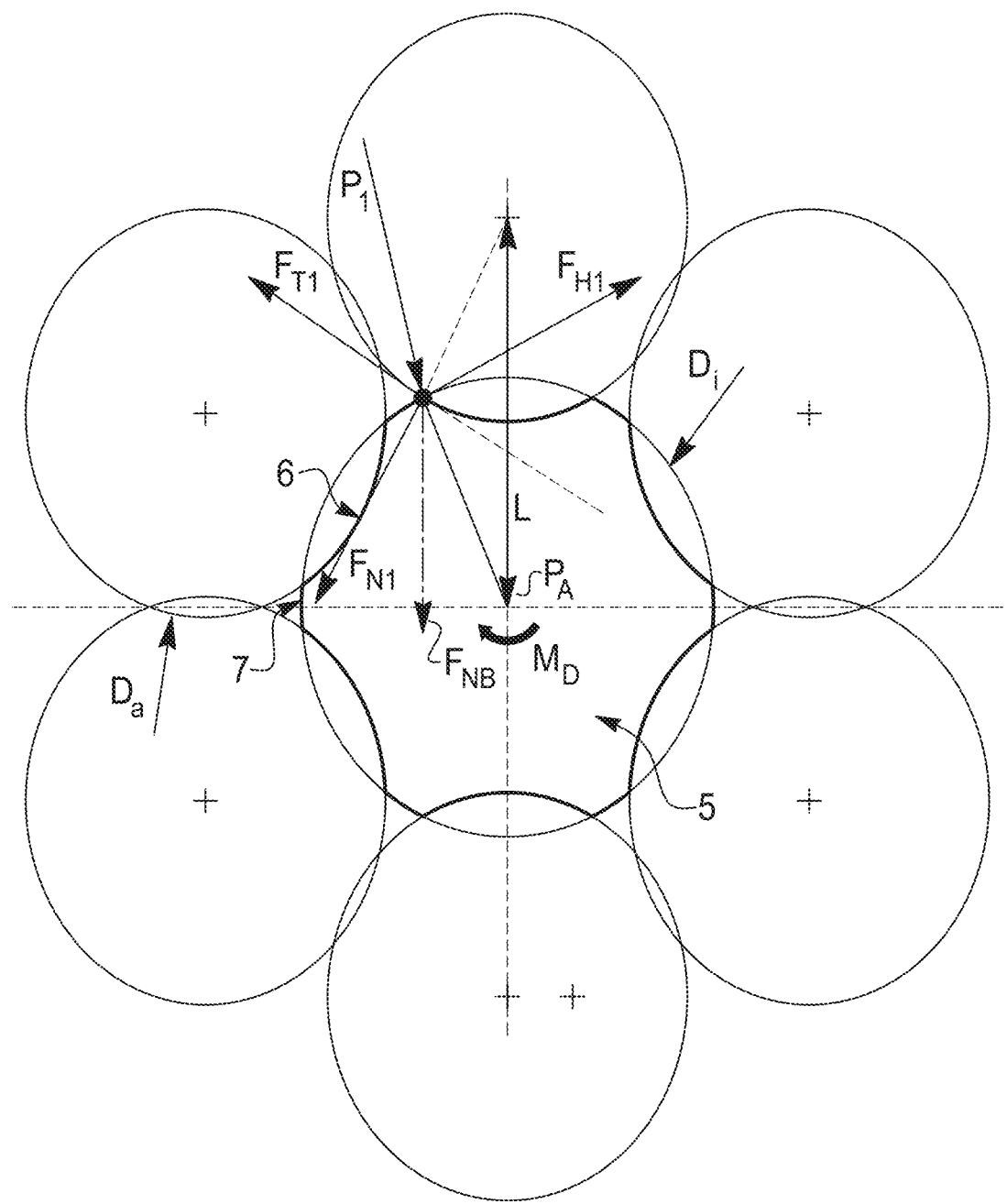
FIG. 7 shows the geometry and the force paths for an external drive profile of a drive element according to the invention, FIG. 8 an example of an outer driving profile according to the invention with dimensions.

FIG. 7 shows the geometry of the outer driving profile 9 of bit 8 at its free, tapered end according to the invention.

It can be seen that the transition surfaces 7 lie on a common circle—the inner circle—with an inner diameter $D_i$. However, the transition surfaces 7 do not have to have a continuous circular arc shape, but can also be flat, for example. It is essential that the transition points between a drive surface 6 and the adjacent transition surface 7, indicated here once by an arrow P1, lie on the common inner circle.

It is further shown that the drive surfaces 6 are located on outer circles of diameter Da distributed uniformly around the profile axis $P_A$ and are formed symmetrically with respect to their longitudinal center plane enclosing the profile axis $P_A$.

The outside diameter $D_a$ as well as the center-to-center distance L between the center points of the inner circle and the outer circles are selected as a function of the inside diameter $D_i$ in such a way that the normal force acting at the transition points between the drive surfaces 6 and the adjacent transition surfaces 7 when a torque $M_D$ about the profile axis $P_A$ is introduced into the drive profile 5 is applied tangentially to the drive surface 6 adjacent to the drive surface. The normal force $F_{N1}$ is indicated as an example for the transition point P1 between the upper contact surface 6 and the transition surface 7 adjacent to the left in FIG. 7.

To generate the desired torque $M_D$, a lever force $F_{H1}$ must act at the point P1. This can be divided into a normal force $F_{N1}$, which is directed perpendicularly to the outer circle on which the drive surface 6 lies and thus runs through its center, and a tangential force $F_{T1}$ running perpendicularly thereto. As can be seen clearly in FIG. 3, the arrangement is such that the normal force $F_{N1}$ runs tangentially to the drive surface 6 located adjacent the upper drive surface 6 to the left thereof. According to the invention, the normal force $F_{N1}$ can also run between the drawn normal force $F_{N1}$ and the profile axis $P_A$, as is indicated by way of example for the dashed arrow $F_{NB}$ in FIG. 7. It is essential that the normal force $F_{N1}$ is introduced into the central area of the outer driving profile 9 or of the component 8 configured as a screw bit and that the beam-shaped transition areas 7 between the drive surfaces 6 are not, or hardly, subjected to bending or shear.

For a given inner diameter $D_i$, the outer diameter $D_a$ and the center-to-center distance L between the center of the inner circle and the centers of the outer circles can be calculated according to the following formula $$L=F(L,D_i)D_i.$$

A running ratio $K=D_a/D_i$ can be selected and should be in the range of 0.3 and 2.0.

Figure 8:
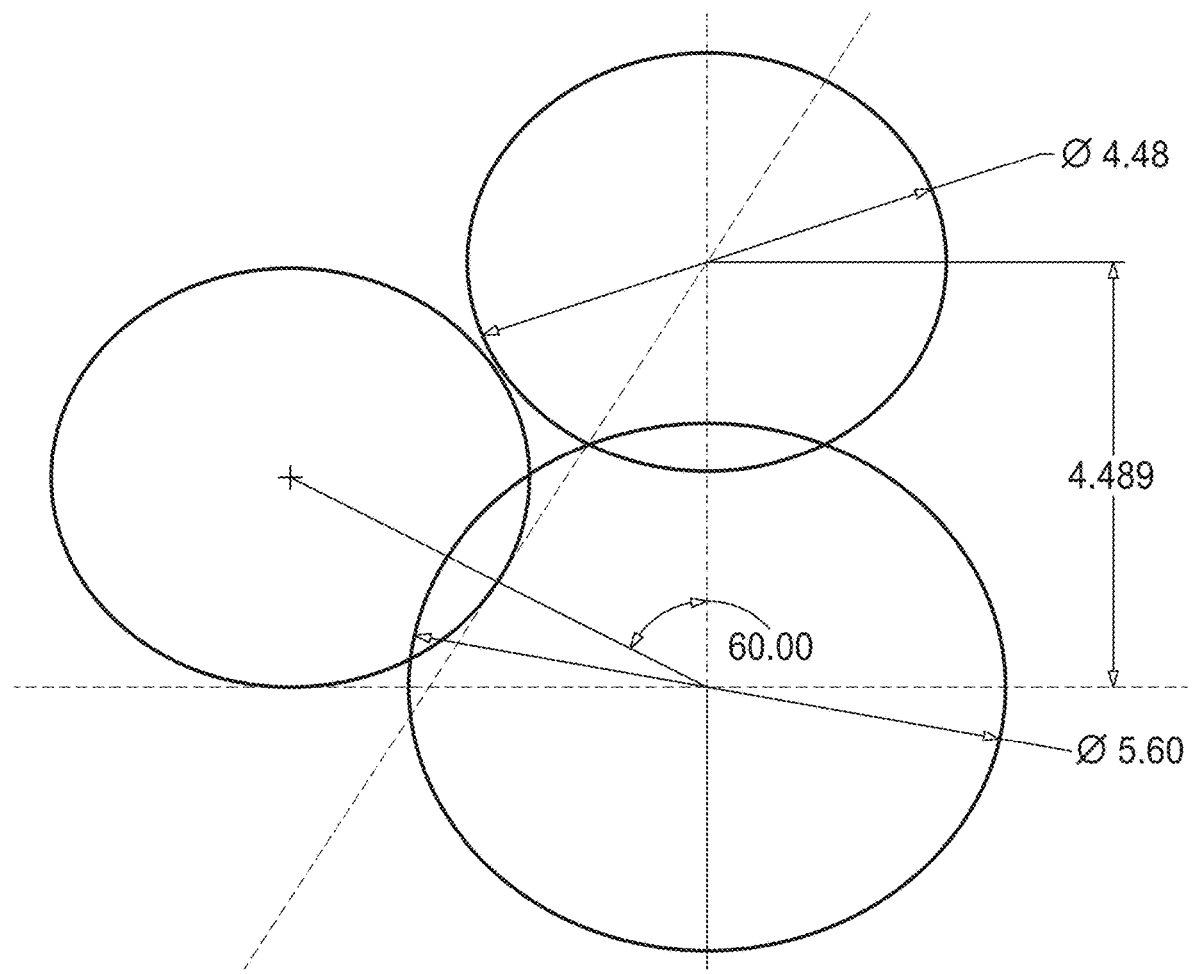

An example of the calculation is shown in FIG. 8. The parameters are selected as follows:

$D_i$=5.6 mm

K=0.8 (freely selected in the above range)

From this, $D_a$ is calculated with $D_a=D_iK$=5.6 0.8=4.48 with $F(L, D_i)=0{,}494e^{(0{,}605K)}=0{,}494e^{(0{,}605\ 0.8)}=0.8015$ can be calculated L L=F(L, $D_i$)$D_i$=0.8015 5.6=4.489.

From these parameters, the geometry shown in FIG. 8 can be constructed.

The geometry of the inner drive profile 5 is selected accordingly with the provision that the outer diameter $D_a$ of the outer drive profile 9 is about 2% smaller than the diameter $D_a$ of the matching inner profile 5. This takes account of the fact that when the drive surfaces are produced by cutting inserts, they are subject to a certain amount of wear, which is greatest in the central area of the drive surfaces because this is where most of the material has to be removed by the cutting inserts. With increasing wear, less material is removed in the central area of the drive surfaces, so that a minimum curvature forms here to compensate for the undersize.

It is noted that the angle of inclination $\alpha_A$ of the driving surfaces and the angle of inclination $\beta_A$ of the transition surfaces are each measured in the circumferential direction centered from the corresponding surface. Thus, the angle is measured in a center plane of the corresponding surface intersecting the profile axis of the respective driving profile.

The invention claimed is:

1. A drive element, comprising:
   an inner driving profile which defines a profile axis and has on an inner side thereof a plurality of convex drive surfaces uniformly distributed around the profile axis defined by the inner driving profile and between which planar or concavely curved transition surfaces are provided, or
   an outer driving profile which defines a profile axis and has on an outer side thereof a plurality of concave drive surfaces distributed uniformly about the profile axis defined by the outer driving profile and between which planar or convexly curved transition surfaces are provided, wherein in cross-section, transition points or transitions between each drive surface and each transition surface lies on a common inner circle with an inner diameter $D_i$, and each drive surface lies on outer circles of an outer diameter $D_a$ distributed uniformly around each profile axis and are formed symmetrically with respect to their longitudinal central plane enclosing each profile axis, wherein the outer diameter $D_a$ and a center-to-center distance L between centers of the outer circles and of the inner circle are selected as a function of the inner diameter $D_i$ such that a normal force acting at the transition points between in each case one drive surface and an adjacent transition surface when a torque $M_D$ about each profile axis is introduced into the inner or outer driving profile, is tangential to a drive surface adjacent to the one drive surface or lies between each adjacent drive surface and each profile axis, and wherein the center-to-center distance L is calculated according to a formula:

$L=F(L, D_i)D_i$, where $F(L, D_i)=0.494e^{(0.605K)}$, wherein a running ratio $K=D_a/D_i$.

2. The drive element according to claim 1, wherein the running ratio $K=D_a/D_i$ is in a range of 0.3 and 2.0.

3. The drive element according to claim 1, further comprising the inner driving profile and the drive surfaces of the inner driving profile are inclined with respect to the profile axis defined by the inner driving profile, approaching the profile axis defined by the inner driving profile starting from an insertion opening of the inner driving profile towards a rear end of the inner driving profile.

4. The drive element according to claim 3, wherein the drive surfaces of the inner driving profile are inclined relative to the profile axis defined by the inner driving profile by an angle of inclination ar which is at least 1°, and/or wherein the drive surfaces of the inner driving profile are inclined relative to the profile axis defined by the inner driving profile by an angle of inclination $\alpha_I$ of at most 5°.

5. The drive element according to claim 3, wherein the transition surfaces defined by the inner driving profile are inclined with respect to the profile axis defined by the inner driving profile and approach the profile axis ($P_I$) starting from the insertion opening of the inner driving profile towards the rear end of the inner driving profile.

6. The drive element according to claim 5, wherein the transition surfaces defined by the inner driving profile are inclined relative to the profile axis defined by the inner driving profile by an angle of inclination $\beta_I$ which is at least 1°, and/or wherein the transition surfaces of the inner driving profile are inclined relative to the profile axis defined by the inner driving profile by an angle of inclination $\beta_I$ of at most 5°.

7. The drive element according to claim 5, wherein an angle of inclination ar of the drive surfaces defined by the inner driving profile relative to the profile axis defined by the inner driving profile is as large as an angle of inclination $\beta_I$ of the transition surfaces defined by the inner driving profile relative to the profile axis defined by the inner driving profile.

8. The drive element according to claim 1, wherein the drive element has the outer driving profile and the drive surfaces of the outer driving profile are inclined with respect to the profile axis defined by the outer driving profile, approaching the profile axis defined by the outer driving profile towards an insertion end of the outer driving profile.

9. The drive element according to claim 8, wherein the drive surfaces defined by the outer driving profile are inclined with respect to the profile axis defined by the outer driving profile by an angle of inclination $\alpha_A$, which is at least 0.5°.

10. The drive element according to claim 8, wherein the transition surfaces defined by the outer driving profile are inclined with respect to the profile axis defined by the outer driving profile at an angle of inclination $\beta_A$ which is greater than 0° and less than 0.7°.

11. The drive element according to claim 8, wherein an angle of inclination $\beta_A$ of the transition surfaces defined by the outer driving profile relative to the profile axis defined by the outer driving profile is smaller than an angle of inclination $\alpha_A$ of the drive surfaces defined by the outer driving profile relative to the profile axis defined by the outer driving profile, a ratio of the angle of inclination $\alpha_A$ to the angle of inclination $\beta_A$ being $\geq 2$.

12. The drive element according to claim 1, wherein each outer diameter $D_a$ is constant over an axial length of the inner or outer driving profile.

13. The drive element according to claim 1, wherein each inner diameter $D_i$ over an axial length of the inner or outer driving profile is constant or increases continuously in adaptation to an inclination of the transition surfaces defined by the inner or outer driving profile with respect to the respective profile axis defined by the inner or outer driving profile in a case of the inner driving profile in a direction of an insertion opening in a case of the outer driving profile starting from an insertion end thereof.

14. The drive element according to claim 1, wherein the inner or outer driving profile has five or six drive surfaces.

15. The drive element according to claim 1, wherein the drive element is a screw and the inner driving profile is formed on a screw head.

16. The drive element according to claim 1, wherein the drive element is a screw bit.

17. A method for connecting two components in a rotationally fixed manner, one of the two components being configured as a drive element with an outer driving profile and an other component being configured as a drive element with an inner driving profile, in which the inner or outer driving profiles of the two components are plugged together axially in order to produce a rotationally fixed connection between the two components, wherein the two components are configured as drive elements according to claim 1 and the inner or outer driving profiles of the drive elements are selected to be complementary to one another in such a way that drive surfaces of the two components come into contact with one another in a 2-dimensional manner when the inner or outer driving profiles are axially plugged together, so that a frictional and/or clamping connection, via which the two components are axially connected to one another, is produced between the two components.

18. The method according to claim 17, wherein the inner or outer driving profiles of the two components have the drive surfaces inclined to their respective profile axis.

19. The method according to claim 18, wherein an angle of inclination $\alpha_i$, by which the drive surfaces of the inner driving profile are inclined with respect to the profile axis defined by the inner driving profile, is greater than an angle of inclination $\alpha_A$, by which the drive surfaces of the outer driving profile are inclined with respect to the profile axis defined by the outer driving profile.

20. The method according to claim 19, wherein the angle of inclination $\alpha_I$ of the drive surfaces of the inner driving profile is 3°±0.2° and the angle of inclination $\alpha_A$ of the drive surfaces of the outer driving profile with respect to the profile axis defined by the outer driving profile is 1.15±0.15°, or that the angle of inclination $\alpha_I$ of the drive surfaces of the inner driving profile relative to the profile axis defined by the inner driving profile is 2°±0.2° and the angle of inclination $\alpha_A$ of the drive surfaces of the outer driving profile relative to the profile axis defined by the outer driving profile is 1.15°±0.15°.

21. The method according to claim 17, wherein the transition surfaces of the inner or outer driving profiles of the two components are inclined with respect to the respective profile axis defined by the inner or outer driving profile, wherein an angle of inclination $\beta_I$ of the transition surfaces (7) of the inner driving profile relative to the profile axis defined by the inner driving profile to an angle of inclination $\beta_A$ by which the transition surfaces of the outer driving profile are inclined relative to the profile axis defined by the outer driving profile is ≥5.

22. The method according to claim 17, wherein drive elements are used in which the outer diameter $D_a$ of the inner driving profile is smaller than the outer diameter $D_a$ of the outer driving profile.

23. The method according to claim 17, wherein the drive surfaces of the two components come into surface contact with one another over at least 25% in a circumferential direction.

24. The method according to claim 17, wherein the two components come into contact with each drive surface on both sides of the longitudinal center plane thereof.

25. The method according to claim 17, wherein the inner or outer driving profiles are configured in such a way that they do not come into contact in a region of the transition surfaces defined by the inner or outer driving profile.

* * * * *